Figure 1:
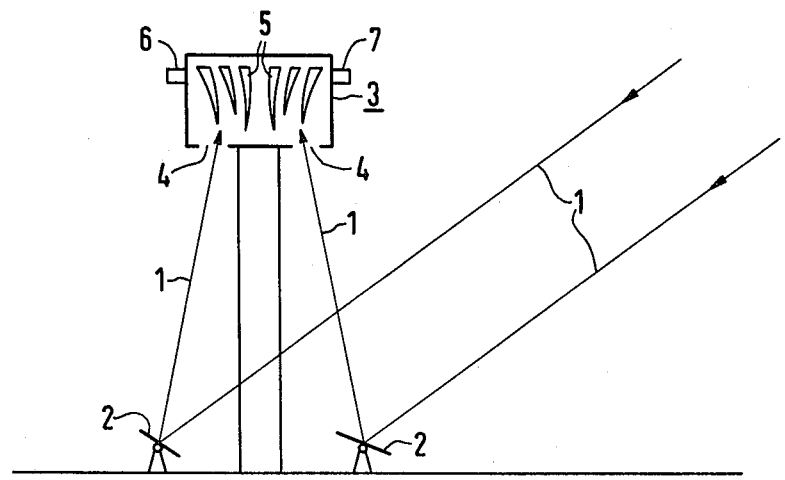

United States Patent [19]

Becker et al.

[11] 4,387,574
[45] Jun. 14, 1983

[54] SOLAR POWER PLANT INCLUDING A SOLAR HEATER ON A TOWER

[75] Inventors: Bernard Becker, Mülheim; Roland Meyer-Pittroff, Eckental; Günter Fröhlich, Mülheim, all of Fed. Rep. of Germany

[73] Assignee: Kraftwerk Union Aktiengesellschaft, Mülheim an der Ruhr, Fed. Rep. of Germany

[21] Appl. No.: 258,369

[22] Filed: Apr. 28, 1981

[30] Foreign Application Priority Data

May 8, 1980 [DE] Fed. Rep. of Germany ....... 3017699

[51] Int. Cl.³ .............................................. F03G 7/02
[52] U.S. Cl. ............................ 60/641.11; 60/641.15; 60/655; 126/438
[58] Field of Search .................. 126/435, 438, 451; 60/641.8, 641.11, 641.15, 653, 655, 676

[56] References Cited

U.S. PATENT DOCUMENTS

| | | | |
|---|---|---|---|
| 3,257,806 | 6/1966 | Stahl | 60/655 |
| 3,924,604 | 12/1975 | Anderson | 60/641.11 |
| 4,010,732 | 3/1977 | Sawata et al. | 126/438 |
| 4,055,948 | 11/1977 | Kraus et al. | 60/655 |
| 4,102,133 | 7/1978 | Anderson | 60/655 |
| 4,249,386 | 2/1981 | Smith et al. | 60/641.15 |
| 4,263,895 | 4/1981 | Colao | 60/641.15 |

*Primary Examiner*—A. Michael Chambers
*Attorney, Agent, or Firm*—Herbert L. Lerner; Laurence A. Greenberg

[57] ABSTRACT

Solar power plant, including a tower, a solar heater disposed on the tower, a plurality of reflectors disposed in a given area for irradiating the solar heater, a water-steam circuit connected to the solar heater for conducting working medium thereto, a steam turbine connected in the water-steam circuit, a preheater for the working medium in the form of additional sunlight collectors being disposed outside of the given area and being connected to the water-steam circuit upstream of the solar heater, and means for adjusting the pressure in the water-steam circuit to cause the pressure of the steam in the solar heater to approximate the atmospheric air pressure outside.

8 Claims, 4 Drawing Figures

SOLAR POWER PLANT INCLUDING A SOLAR HEATER ON A TOWER

The invention relates to a solar power plant including a solar heater on a tower, irradiated by numerous reflectors which are arranged in a water-steam circuit containing a steam turbine, and in which a preheater for the working medium is disposed before the solar heater.

A solar power plant of this type is described in German Published, prosecuted Application DE-AS No. 26 54 125. In this arrangement during the hours of full sunshine, a solar heater which is disposed on a tower and irradiated by numerous reflectors is used for generating steam, (a field of many mirrors). In the morning and evening hours, a heat exchanger which serves for preheating the feed water can be connected before the solar heater. In this way, the evaporation takes place in the solar heater, and in some cases a further heat exchanger is arranged after the solar heater for superheating the steam.

A similar installation is described in the Austrian "Zeitschrift für Elektrizitätswirtschaft 29", October 1976, number 10, page 408. In that publication, an oil boiler which can be operated as required either in series or in parallel with the solar heater is connected before the solar heater. Depending on the availability of solar energy, the steam leaving the solar heater can be fed to a high pressure or low pressure turbine.

These known solar energy installations with a solar heater disposed on a tower which is irradiated by numerous reflectors with concentrated sunrays, on one hand have the advantage that almost any high temperatures can be generated with the sunrays, but on the other hand they are very costly with respect to the cost of the solar heater and the individual reflectors or mirrors which must track the incidence angle of the sunrays. Furthermore, the high temperatures which can be achieved by the condensed sunrays in solar power plants cannot be fully utilized for the associated process cycle, because of the limited stability of the heat exchanger tubes. In gas turbines as well as in steam turbine installations, the temperatures at the output of the solar heater must not exceed much more than 900° C.

It is accordingly an object of the invention to provide a solar power plant including a solar heater on a tower, which overcomes the hereinafore-mentioned disadvantages of the heretofore-known devices of this general type, and to create a solar power plant wherein almost the total sun energy supplied by the reflector field to the solar heater can be transformed to electrical current, and wherein the degree of effectiveness can be improved by raising the exit temperature of the steam leaving the solar heater.

With the foregoing and other objects in view there is provided, in accordance with the invention, a solar power plant, comprising a tower, a solar heater disposed on the tower, a plurality of reflectors disposed in a given area for irradiating the solar heater, a water-steam circuit connected to the solar heater for conducting working medium thereto, a steam turbine connected in the water-steam circuit, a preheater for the working medium in the form of additional sunlight collectors being disposed outside of the given area and being connected to the water-steam circuit upstream of the solar heater, and means for adjusting the pressure in the water-steam circuit to cause the pressure of the steam in the solar heater to approximate the atmospheric air pressure outside.

In accordance with another feature of the invention, there are provided, eventually, heat exchangers connected in the water-steam circuit upstream of the solar heater, the preheater, additional sunlight collectros and heat exchangers being arranged for evaporating and superheating feedwater before entering the solar heater.

In accordance with a further feature of the invention, the steam turbine is connected downstream of the solar heater in the water-steam circuit, and there is provided a waste heat exchanger having a primary circuit connected in the water-steam circuit downstream of the steam turbine and a secondary circuit having a connection to the water-steam circuit upstream of the solar heater for superheating steam generated in the additional sunlight collectors.

In accordance with an added feature of the invention, the steam turbine is connected downstream of the solar heater in the water-steam circuit, and there is provided a waste heat exchanger having a primary circuit connected in the water-steam circuit downstream of the steam turbine and a secondary circuit, another water-steam circuit, the waste heat exchanger having the secondary circuit connected in the other water-steam circuit as an evaporator, and another steam turbine connected in the other water-steam circuit, the other steam turbine having an intake and operating with super-pressure at the intake.

In accordance with an additional feature of the invention, there is provided a back-pressure steam turbine in the water-steam circuit operating at super-pressure being connected in the secondary circuit, and another heat exchanger for condensation of steam taken from the back-pressure turbine and for evaporating the working medium conducted to the solar heater, the other heat exchanger forming the connection of the secondary circuit to the water-steam circuit upstream of the solar heater.

In accordance with again another feature of the invention, there is provided a further heat exchanger having a first circuit thereof connected in the water-steam circuit upstream of the solar heater for preheating the working medium and a second circuit connected to the primary circuit of the waste heat exchanger downstream thereof, and a condenser connected in the water-steam circuit downstream of the second circuit of the further heat exchanger, so that the outflow of the waste heat exchanger is connected to the condenser through the further heat exchanger.

In accordance with again a further feature of the invention, the solar heater has a chamber disposed therein and a bottom having horizontal beam entrance openings formed therein, the water-steam circuit being connected to the chamber for conducting steam thereto, and the beam entrance openings serve for equalizing pressure between the chamber and the outer atmosphere.

In accordance with a concomitant feature of the invention, there are provided ceramic components disposed in the solar heater.

Other features which are considered as characteristic for the invention are set forth in the appended claims.

Although the invention is illustrated and described herein as embodied in a solar power plant including a solar heater on a tower, it is nevertheless not intended to be limited to the details shown, since various modifications and structural changes may be made therein without departing from the spirit of the invention and within the scope and range of equivalents of the claims.

Figure 2:
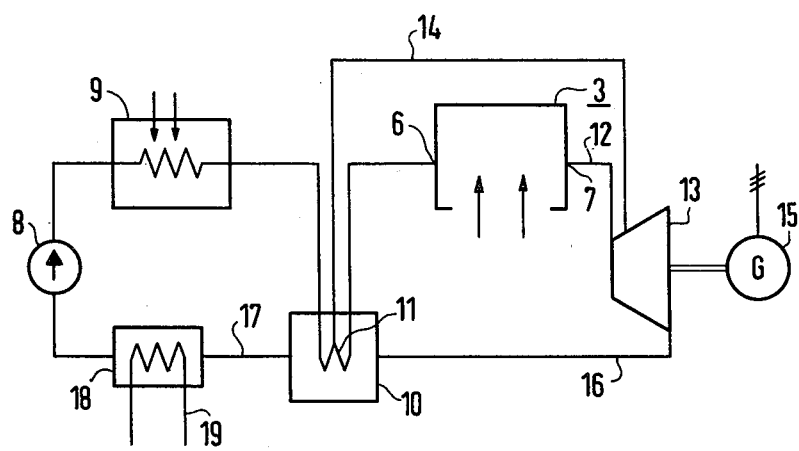
Figure 3:
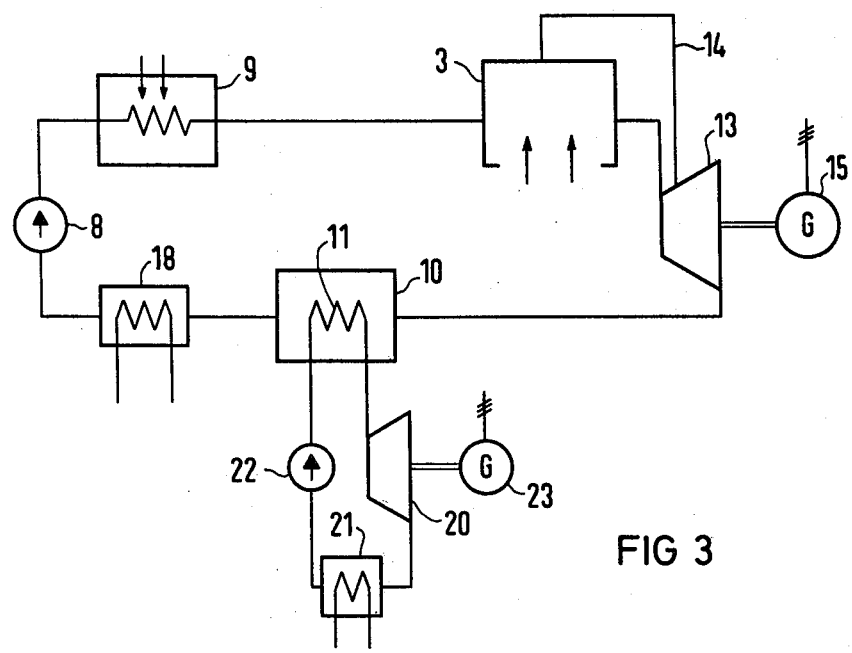
Figure 4:
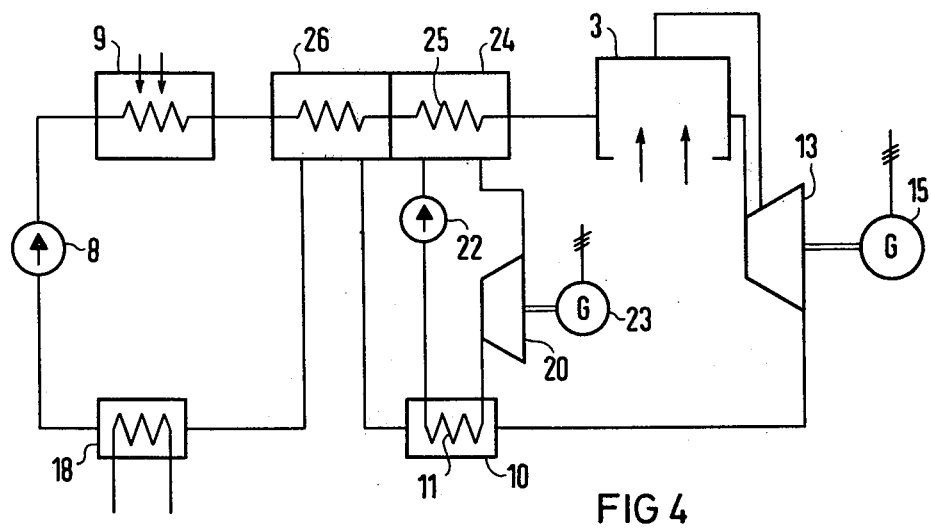

The construction and method of operation of the invention, however, together with additional objects and advantages thereof will be best understood from the following description of specific embodiments when read in connection with the accompanying drawings, in which:

FIG. 1 is a diagrammatic front-elevational view of the overall arrangement for a solar heater which is suitable for the invention; and FIGS. 2, 3 and 4 are schematic and block diagrammatic views of different heat flow diagrams for one or two water-steam circuits according to the invention.

Referring now to the figures of the drawing and first particularly to FIG. 1 thereof, it is seen that sunrays 1 are incident on a group of reflectors including individual mirrors 2 which are capable of following the sunrays 1. The sunrays are reflected by the mirrors, and reach the interior chamber of the solar heater 3 through beam-entrance openings 4. Inside the solar heater 3, components 5, preferably made of ceramic material, are disposed and so arranged that on one hand they are heated to high temperatures by the sunrays 1, and on the other hand a steam flow develops along the surfaces of the components. The steam therefore enters through an entrance pipe 6 into the inner chamber of the solar heater 3, and leaves the solar heater through an exit pipe 7 at a substantially higher temperature depending on the temperature irradiation by the sun.

FIG. 2 shows an example of a heat flow diagram of the water-steam circuit used in the solar power plant according to the invention. In order to make sure that steam enters the entrance pipe 6 of the solar heater 3 in every case, a sunlight collector 9 is disposed between a conventional feedwater pump 8 and the solar heater. In the most simple case, the sun collector 9 is formed of a tube in which the feed water is preheated and evaporated, and wherein the irradiation by the sun can be increased by semicircular mirror surfaces. The pipes for the sunlight or solar collectors can be arranged on the floor and are capable of generating temperatures somewhat above 100° C.

In the embodiment according to FIG. 2, the secondary circuit of a heat exchanger 10 for the waste heat is disposed after or downstream of the sunlight collector 9, which is shown in the drawing in place of numerous collectors. The sunlight collector 9, as well as the secondary circuit 11 of the waste heat exchanger 10, are disposed before or upstream of the solar heater 3.

For example, during irradiation by the sun, the feedwater which is moved by the feedwater pump 8 is evaporated in the sunlight collector 9 at an atmospheric pressure of about 1 bar, so that steam at a temperature of 110° and a pressure of 1 bar leaves the sunlight collector 9, and enters into the secondary circuit 11 of the waste heat exchanger 10. In the heat exchanger 10 the steam is superheated to approximately 540° C., and enters at this temperature into the solar heater 3. The steam is further heated in the solar heater, so that the live steam leaving the solar heater 3 through a pipeline 12 has a temperature of approximately 1100° C. at a pressure of 1 bar. The pipeline 12 is connected to a steam turbine 13 which is specially constructed for high temperatures. For cooling the first rows of turbine blades of the turbine 13, cooler steam is branched off through a bypass line 14 from the secondary circuit of the waste heat exchanger 10, and fed with a pressure of 1 bar and a temperature of 300° C. into the cooling input of the steam turbine 13.

As customary with low pressure turbines, the steam is expanded in the steam turbine 13 to approximately 0.1 bar, and leaves the steam turbine 13 at a temperature of about 600° C. The work or energy provided by the turbine 13 is changed into electrical energy by coupling to an electric generator 15. The exhaust steam line 16 of the steam turbine 13 is connected to the primary circuit of the waste heat exchanger 10, so that the steam which leaves the steam turbine at about 600° C. is used to superheat the steam leaving the sunlight collector 9. In the waste heat exchanger 10 the steam is cooled to approximately 150° C. at an unchanged pressure of 0.1 bar, it then travels from the waste heat exchanger 10 to a condenser 18 through a line 17, as is conventional practice in water-steam circuits. The condenser 18 is provided with cooling water pipelines 19, which can be connected to a river or cooling tower for removing the heat.

The water produced in the condenser (possibly after preparation and purification) is conducted again to the feedwater pump 8, where it arrives with a pressure of about 0.1 bar and at a temperature of 45° C., and is again compressed to the upper system pressure of 1 bar.

The hereinafore-described arrangement has two definite advantages compared to the known, above-mentioned solar power plants. First, due to the low water pressure, the evaporation heat can be supplied to the feedwater by relatively low-priced sunlight collectors at low temperatures of about 100° C. Secondly, since at the specified pressure it is not necessary to seal the steam in the solar heater 3 in the direction toward the atmosphere, it is possible to use ceramic materials in the solar heater, and thus it is possible to use materials which are especially non-sensitive to temperatures. Therefore, the upper temperature limit which can be achieved depends only on the capacity of the steam turbine 13.

A higher efficiency for the process cycle can be achieved by the arrangement according to FIG. 3. In the FIG. 3 embodiment, the high exhaust enthalpy of the steam leaving the steam turbine 13 is utilized in a secondary steam process which operates at the conventional pressure 11 of the waste heat exchanger 10 which follows the steam turbine 13 is connected upstream of or before a second steam turbine 20. The exhaust steam of the second turbine 20 is condensed in a condenser 21, and the condensate is again fed into the secondary circuit 11 of the waste heat exchanger through a feed pump 22. In this typical arrangement the by-pass line 14 is connected to a point in the solar heater 3, where steam at a moderate temperature of 300° C. is available for cooling purposes. Similar to the steam turbine 13, the steam turbine 20 is also connected with a generator 23 for generating electrical energy.

In the embodiment according to FIG. 4, the effectiveness of the whole installation can again be increased. In this embodiment the secondary circuit 11 of the waste heat exchanger is again connected before or upstream of a steam turbine 20, and receives feedwater from a feed pump 22. However, instead of the condenser 21, there is provided a heat exchanger 24, the secondary circuit 25 of which is arranged directly before the solar heater 3. In this way the steam turbine 20 must operate as an impulse or back pressure type turbine, in order for a pre-superheating of the steam generated in the sunlight collector 9 to take place in the secondary circuit 25 of the heat exchanger 24.

Furthermore, the installation according to FIG. 4 also differs from the one in FIG. 2 by the fact that the steam which was cooled in the waste heat exchanger 10 is not directly fed into the condenser 18, but is conducted to a heat exchanger 26 to give off further heat. The secondary circuit of the heat exchanger 26 is disposed before the secondary circuit 25 of the heat exchanger 24 and the sunlight collector 9. The steam generated in the sunlight collector 9 is therefore first superheated in the heat exchanger 26, and then in the heat exchanger 24 until it reaches its final live steam temperature in the solar heater 3. Obviously, the heat exchangers 24 and 26 can contain auxiliary heating means, to make certain that even in periods with little sunshine the water supplied by the feed pump 8 enters the solar heater 3 in the form of steam.

There is claimed:

1. Solar power plant, comprising a tower, a solar heater disposed on said tower, a plurality of reflectors disposed in a given area for irradiating said solar heater, a water-steam circuit connected to said solar heater for conducting working medium thereto, a steam turbine connected in said water-steam circuit, a preheater for the working medium in the form of additional sunlight collectors being disposed outside of said given area and being connected to said water-steam circuit upstream of said solar heater, and means for adjusting the pressure in said water-steam circuit to cause the pressure of the steam in said solar heater to approximate the atmospheric air pressure outside.

2. Solar power plant according to claim 1, including heat exchangers connected in said water-steam circuit upstream of said solar heater, said additional sunlight collectors and heat exchangers including means for evaporating and superheating feedwater before entering said solar heater.

3. Solar power plant according to claim 1, wherein said steam turbine is connected downstream of said solar heater in said water-steam circuit, and including a waste heat exchanger having a primary circuit connected in said water-steam circuit downstream of said steam turbine and a secondary circuit having a connection to said water-steam circuit upstream of said solar heater for superheating steam generated in said additional sunlight collectors.

4. Solar power plant according to claim 1, wherein said steam turbine is connected downstream of said solar heater in said water-steam circuit, and including a waste heat exchanger having a primary circuit connected in said water-steam circuit downstream of said steam turbine and a secondary circuit, another water-steam circuit, said waste heat exchanger having said secondary circuit connected in said other water-steam circuit as an evaporator, and another steam turbine connected in said other water-steam circuit, said other steam turbine having an intake and operating with super-pressure at said intake.

5. Solar power plant according to claim 3, including a back-pressure steam turbine operating at super-pressure being connected in said secondary circuit, and another heat exchanger for condensation of steam taken from said back-pressure turbine and for evaporating the working medium conducted to said solar heater, said other heat exchanger forming said connection of said secondary circuit to said water-steam circuit upstream of said solar heater.

6. Solar power plant according to claim 5, including a further heat exchanger having a first circuit thereof connected in said water-steam circuit upstream of said solar heater for preheating the working medium and a second circuit connected to said primary circuit of said waste heat exchanger downstream thereof, and a condenser connected in said water-steam circuit downstream of said second circuit of said further heat exchanger.

7. Solar power plant according to claim 1, wherein said solar heater has a chamber disposed therein and a bottom having horizontal beam entrance openings formed therein, said water-steam circuit being connected to said chamber for conducting steam thereto, and said beam entrance openings serve for equalizing pressure between said chamber and the outer atmosphere.

8. Solar power plant according to claim 1, including ceramic components disposed in said solar heater.

* * * * *